United States Patent [19]

Turbak et al.

[11] 4,341,807

[45] Jul. 27, 1982

[54] FOOD PRODUCTS CONTAINING MICROFIBRILLATED CELLULOSE

[75] Inventors: Albin F. Turbak, Convent Station; Fred W. Snyder, Wharton, both of N.J.; Karen R. Sandberg, Shelton, Wash.

[73] Assignee: International Telephone and Telegraph Corporation, New York, N.Y.

[21] Appl. No.: 202,741

[22] Filed: Oct. 31, 1980

[51] Int. Cl.$^3$ ............................................. A23L 1/04
[52] U.S. Cl. .................................. 426/570; 426/573; 426/579; 426/589; 426/599
[58] Field of Search ............... 426/654, 573, 658, 564, 426/599, 589, 580, 570, 804

[56] References Cited

U.S. PATENT DOCUMENTS

| | | | |
|---|---|---|---|
| Re. 14,633 | 4/1919 | Kearn | 426/599 |
| 3,023,104 | 2/1962 | Battista | 426/565 |
| 3,067,037 | 12/1962 | Herald | 426/564 |
| 3,083,104 | 3/1963 | Celmer | 426/599 |
| 4,042,719 | 8/1977 | Ignacz | 426/573 |
| 4,087,317 | 5/1978 | Roberts | 162/187 |
| 4,143,163 | 3/1979 | Hutchison et al. | 426/573 |
| 4,156,021 | 5/1979 | Richardson | 426/573 |
| 4,241,090 | 12/1980 | Stroz et al. | 426/4 |

*Primary Examiner*—Jeanette M. Hunter
*Attorney, Agent, or Firm*—James B. Raden; Harold J. Holt

[57] ABSTRACT

A food product containing microfibrillated cellulose is prepared by mixing together an edible liquid which swells cellulose, a food additive and fibrous cellulose to form a liquid suspension. The suspension is repeatedly passed through a small diameter orifice in which the mixture is subjected to a pressure drop of at least 3000 psig and a high velocity shearing action followed by a high velocity decelerating impact. The process converts the cellulose into microfibrillated cellulose and forms a stable homogeneous suspension of the microfibrillated cellulose, liquid and food additive.

9 Claims, No Drawings

FOOD PRODUCTS CONTAINING MICROFIBRILLATED CELLULOSE

This invention relates to a process for preparing food products containing microfibrillated cellulose and to the products thus prepared.

In our copending application Ser. No. 313,726 filed Oct. 22, 1981 which is a continuation of Ser. No. 107,446, filed Dec. 26, 1979, now abandoned there is disclosed a new type of cellulose, denominated microfibrillated cellulose, distinguished from prior celluloses by a vastly increased surface area, greater liquid absorption characteristics and greater reactivity. The microfibrillated cellulose there disclosed is prepared be repeatedly passing a liquid suspension of fibrous cellulose through a high pressure homogenizer until the cellulose suspension becomes substantially stable. The process converts the cellulose into microfibrillated cellulose without substantial chemical change.

Microfibrillated cellulose has been found to be useful in a wide variety of applications, many of them disclosed in our copending application Ser. No. 202,740, filed of even data herewith. Among the many uses of microfibrillated cellulose are as a thickener, flavor carrier and suspension stabilizer for a wide variety of food products.

The present invention is based on the discovery that it is possible to prepare a wide variety of food products containing microfibrillated cellulose in a single stage operation in which the microfibrillated cellulose is prepared in situ during preparation of the food product. The ingredients of the food product are added to the original slurry containing fibrous cellulose prior to fibrillation of the cellulose. The fibrillation process then converts the cellulose to microfibrillated cellulose and produces a food product in the form of a homogeneous, stable suspension containing microfibrillated cellulose. The process of the invention is useful for producing fillings, crushes, soups, gravies, puddings, dips, toppings and other food products.

Specifically, the process of the invention comprises mixing together an edible liquid which swells cellulose, a food additive and fibrous cellulose to form a liquid suspension and repeatedly passing the liquid suspension through a small diameter orifice in which the mixture is subjected to a pressure drop of at least 3000 pounds per square inch gauge and a high velocity shearing action followed by a high velocity decelerating impact. The process converts the cellulose into microfibrillated cellulose and forms a stable homogeneous suspension of the mirofibrillated cellulose, liquid and food additive. The process has the obvious cost advantage of preparing the microfibrillated cellulose and food product in a single stage operation. In addition, there are also in some cases product advantages which result from the single stage technique. The properties of certain of the products are distinguishable from the properties of corresponding products prepared from the same ingredients in which the microfibrillated cellulose is separately prepared.

The edible liquid suspending medium may be water or any other liquid which wets or swells cellulose. Liquids which do not swell cellulose, such as certain mineral oils and isopropanol may be present but cannot be used as the suspending medium because microfibrillated cellulose cannot be produced in the absence of a liquid which swells cellulose. Other useful liquids are the edible lower alcohols such as ethyl alcohol, glycerine and propylene glycol.

The proportion of cellulose in the starting slurry or suspension may vary depending, among other factors, on the fiber size of the starting cellulose and the size of the homogenizer or other equipment in which the fibrillation process is carried out. Larger homogenizers and smaller particle size or shorter fiber length starting cellulose permits use of larger concentrations of cellulose. In addition, as explained below, the cellulose concentration may also be increased by the presence of a hydrophilic polymer. Generally, the starting suspension will contain from 0.5 to 10% by weight of cellulose, usually from 1 to 6%.

The food additive or additives may be any liquid or finely divided solid food product which forms an edible mixture or suspension with cellulose. Nonlimiting examples of such food additives are fruit juices, frozen fruit juices and fruit juice concentrates, chicken and beef bouillons, natural vegetable juices and nonfat dry milk with or without the addition of a variety of food flavors, sweeteners and other well known food additives.

The process of the invention is assisted by the addition to the starting mixture of a hydrophilic polymer such as a cellulose ester or ether, a synthetic acid polymer (or copolymer), a natural gum or a starch. Examples of such hydrophilic polymers are carboxymethyl cellulose, methyl cellulose (methocel), hydroxypropyl cellulose, polyacrylic acid, carageenin and guar gum. Addition of the hydrophilic polymer to the liquid suspending medium, prior to cellulosic pulp addition, appears to prevent dewatering of the pulp (or other fibrous cellulose) under the high pressures of the fibrillation process and thus allows the slurry to pass through the homogenizer at higher slurry concentrations. Moreover, the microfibrillated cellulose produced with the additive present also displays improved dewatering resistance under pressure and thus produces improved suspensions in accordance with the invention in those food products where smoothness is important, as for example in puddings and toppings. The hydrophilic polymer will enhance the fibrillation process at levels as low as 0.1% by weight of the product, and may be used in amounts as high as 25%, depending on the nature of the suspension.

The following examples illustrate the practice of the invention. Unless otherwise indicated, all parts and percentages are by weight.

EXAMPLES 1 and 2

A series of toppings, puddings, fillings and dips were prepared by one or both of two methods: (1) Premixing all of the ingredients, including cellulosic pulp, water and food components, following by passing through an homogenizer and in situ production of microfibrillated cellulose in accordance with the process of the invention. (2) The second method consisted of the prior preparation of microfibrillated cellulose followed by admixture of the microfibrillated cellulose slurry and the food additives. Both methods used the same grade and fiber size of cellulosic pulp in a 2% slurry in water as the starting material and both methods entailed passing the respective slurries through an homogenizer having an 8000 psig pressure drop for ten passes, at which time a stable gel point was reached. The starting temperature of the processes was 25° C. in each instance. In these examples, a low calorie topping (unflavored) was made by the two methods from a composition containing 8% soybean oil, 6% sugar, 2.2% cellulose and 83.8% water. By method 1, the ingredients were all admixed with cellulosic pulp and the food topping and microfibrillated cellulose prepared in one step by passing the mixture through the homogenizer. By method 2, the pulp was first microfibrillated and then the oil was added and emulsified. The sugar was added last. It was found that method 1 gave a superior product—the topping made by the one step procedure was smoother and more consistent in texture.

EXAMPLES 3-5

In this series of examples, the same two methods were used for the preparation of a series of puddings and dips. Each of the products were prepared from a neutral pudding base composition containing 7% nonfat dry milk, 0.13% carboxymethylcellulose, 1.86% soybean oil, 2.32% cellulose and 88.69% water. In method 1, they were all passed through the homogenizer together; in method 2, the cellulose was first fibrillated and then mixed with the nonfat dry milk and microfibrillated cellulose. Example 3 consisted of the foregoing pudding base prepared by both methods 1 and 2. Example 4 was a lemon pudding prepared by both methods from the foregoing pudding base to which was added lemon juice and sugar. Example 5 was a dip prepared by both methods from the same pudding base to which was added onion soup and a party dip mix. In all examples, the results were essentially the same, regardless of which method was used. The product was firm and smooth and there was little or no perception of fibrous material.

EXAMPLE 6

Both methods were again used as set forth in Examples 1 and 2 to prepare a series of fillings and crushes. Frozen orange juice concentrate, sweetened frozen lemonade concentrate and grape sweetened frozen concentrate were added either to a 2% microfibrillated cellulose slurry or to a 2% slurry of cellulosic pulp which was then fibrillated. The result in each case was a filling or crush in the form of a stable homogeneous suspension. The orange crushes or fillings prepared by methods 1 and 2 were indistinguishable. The lemon and grape crushes or fillings had a slightly stronger fruit flavor when prepared by method 2.

EXAMPLE 7

Both methods were again used as set forth in Examples 1 and 2 to prepare a series of soups and gravies. The microfibrillaated cellulose was used as a thickener in the soups to produce "creamed" soups and to give body to the gravies. The microfibrillated cellulose content of the gravies was 2%. For the soups it was reduced to 0.75%. Chicken bouillon and natural celery juice were used as the food additives to prepare cream of chicken and celery soup respectively. In some cases, food coloring was also added to improve visual quality. Both methods 1 and 2 produced good quality soups. In the case of the cream of celery soup, there was slightly more celery flavor with method 2. No difference was noted in the gravies produced by methods 1 and 2. Both had acceptable taste, color and texture.

The microfibrillated cellulose produced in accordance with the invention, whether independently of or during preparation of the food product, is more specifically defined as cellulose having a water retention value over 280%, a settling volume after 60 minutes in a 0.5% by weight suspension in water of greater than 60% and a rate of degradation increase by hydrolysis at 60° C. in one molar hydrochloric acid at least twice as great as cellulose beaten to a Canadian Standard Freeness value of 50 ml. Further and more detailed information concerning microfibrillated cellulose, as well as its preparation, may be found in our aforesaid copending application Ser. No. 107,446, the disclosure of which is hereby incorporated by reference.

We claim:

1. A process for the preparation of a food product comprising
    mixing together an edible liquid which swells cellulose, an additive which imparts a food flavor and fibrous cellulose to form a liquid suspension, said liquid suspension containing no more than 10% by weight of fibrous cellulose,
    repeatedly passing said liquid suspension through a high pressure homogenizer having a small diameter orifice in which the mixture is subjected to a pressure drop of at least 3000 pounds per square inch gauge and a high velocity shearing action followed by a high velocity decelerating impact against a solid surface,
    said process converting said cellulose into microfibrillated cellulose and forming a stable homogeneous suspension of said microfibrillated cellulose, liquid and food additive.

2. The process of claim 1 in which the additive is fruit juice concentrate and the food product is a filling or crush.

3. The process of claim 1 in which the additive is meat flavored bouillon and the food product is a soup or gravy.

4. The process of claim 1 in which the additive is a nonfat dry milk and a hydrophilic polymer and the food product is a pudding.

5. The process of claim 1 in which the food product is a dip.

6. The process of claim 1 in which the additive is soybean oil and a sweetener and the food product is a topping.

7. The process of claim 1 in which an hydrophilic polymer is added to the starting mixture before passing the suspension through the small diameter orifice.

8. The process of claim 7 in which the hydrophilic polymer is selected from the group consisting of a cellulose ester and ether, a synthetic acid polymer, a natural gum and a starch.

9. The product of the process of claim 1.

* * * * *